United States Patent
Liu et al.

(10) Patent No.: US 9,020,233 B2
(45) Date of Patent: Apr. 28, 2015

(54) METHOD AND SYSTEM FOR UP-VECTOR DETECTION FOR RIBS IN COMPUTED TOMOGRAPHY VOLUMES

(75) Inventors: David Liu, Tampa, FL (US); Hao Xu, Princeton, NJ (US); Dijia Wu, North Brunswick, NJ (US); Christian Tietjen, Fürth (DE); Grzegorz Soza, Heroldsberg (DE); Shaohua Kevin Zhou, Plainsboro, NJ (US); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 254 days.

(21) Appl. No.: 13/602,660

(22) Filed: Sep. 4, 2012

(65) Prior Publication Data

US 2013/0070996 A1    Mar. 21, 2013

Related U.S. Application Data

(60) Provisional application No. 61/536,093, filed on Sep. 19, 2011.

(51) Int. Cl.
*G06K 9/00* (2006.01)
*G06K 9/48* (2006.01)
*G06K 9/62* (2006.01)

(52) U.S. Cl.
CPC .. *G06K 9/00* (2013.01); *G06K 9/48* (2013.01); *G06K 9/62* (2013.01)

(58) Field of Classification Search
USPC ............................................. 382/100, 128–132
See application file for complete search history.

(56) References Cited

U.S. PATENT DOCUMENTS

| | | | |
|---|---|---|---|
| 6,345,113 B1 * | 2/2002 | Crawford et al. | 382/131 |
| 6,594,378 B1 * | 7/2003 | Li et al. | 382/128 |
| 7,369,693 B2 * | 5/2008 | Shen | 382/128 |
| 8,150,135 B2 | 4/2012 | Acharyya et al. | |
| 8,165,376 B2 | 4/2012 | Shen et al. | |
| 2006/0173271 A1 | 8/2006 | Shen et al. | |
| 2006/0173272 A1 | 8/2006 | Qing et al. | |
| 2008/0107318 A1 | 5/2008 | Kiraly | |
| 2010/0239140 A1 * | 9/2010 | Ruijters et al. | 382/130 |

OTHER PUBLICATIONS

Aylward et al. "Initialization, Noise, Singularities, and Scale in Height Ridge Traversal for Tubular Object Centerline Extraction," IEEE, Feb. 2002.*
Felkel, et al. "Surface Models of Tube Trees," IEEE, 2004.*

* cited by examiner

*Primary Examiner* — Shefali Goradia

(57) ABSTRACT

A method and system for up-vector detection for ribs in a 3D medical image volume, such as a computed tomography (CT) volume is disclosed. A rib centerline of at least one rib is extracted in a 3D medical image volume. An up-vector is automatically detected at each of a plurality of centerline points of the rib centerline of the at least one rib. The up-vector at each centerline point can be detected using a trained regression function. Alternatively, the up-vector at each centerline point can be detected by detecting an ellipse shape in a cross-sectional rib image generated at each centerline point.

28 Claims, 8 Drawing Sheets

METHOD AND SYSTEM FOR UP-VECTOR DETECTION FOR RIBS IN COMPUTED TOMOGRAPHY VOLUMES

This application claims the benefit of U.S. Provisional Application No. 61/536,093, filed Sep. 19, 2011, the disclosure of which is herein incorporated by reference.

BACKGROUND OF THE INVENTION

The present invention relates to visualizing the ribs in computed tomography (CT) volumes, and more particularly to detecting "up-vectors" of ribs in 3D CT volumes to unfold the rib cage into a 2D image.

Ribs can be affected by a variety of disorders, such as traumatic, metabolic, and congenital disorders. CT imaging can help visualize lesions on the ribs. However, the multi-slice scan generated in a 3D CT volume provides a large amount of data that is difficult and tedious for physicians to examine. Therefore, computer aided detection is important in helping doctors to visualize the lesions on the ribs.

A computer aided detection system that can help doctors locate rib lesions easily and accurately is desirable. An important aspect of such a system is the ability to unfold the CT volume data from 3D to 2D. This is because small lesions are typically difficult to identify and locate in the 3D CT volume, but easier to locate in a corresponding 2D unfolded image. In addition, there may be different interpretations for the same lesion caused by the transverse sections of ribs with respect to either the long or short axes of the rib. Accordingly, a method that correctly unfolds the 3D rib cage into 2D can not only save examination time, but also decrease the ambiguity of interpreting the CT data.

BRIEF SUMMARY OF THE INVENTION

The present invention provides a methods and systems for detecting up-vectors of ribs in a 3D medical image volume, such as a 3D computed tomography (CT) volume, and unfolding a rib cage in a 3D medical image volume into a 2D image. Embodiments of the present invention predict up-vectors at rib centerline points using either a machine learning-based method or a non-learning-based method and unfold the ribs in a 3D volume based on the up-vectors to generate a 2D image.

In one embodiment of the present invention, a rib centerline of at least one rib is extracted in a 3D medical image volume. An up-vector is automatically detected at each of a plurality of centerline points of the rib centerline of the at least one rib. In one embodiment, the up-vector at each centerline point is detected using a trained regression function. In another embodiment, the up-vector at each centerline point is detected by detecting an ellipse shape in a cross-sectional rib image generated at each centerline point.

These and other advantages of the invention will be apparent to those of ordinary skill in the art by reference to the following detailed description and the accompanying drawings.

DETAILED DESCRIPTION

The present invention is directed to methods and systems for predicting up-of ribs in 3D medical image volume, such as a 3D computed tomography (CT) volume, and unfolding the ribs in the 3D volume into a 2D image. Embodiments of the present invention are described herein to give a visual understanding of the up-vector prediction and rib unfolding methods. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Embodiments of the present invention utilize a method to unfold a rib cage in a 3D CT volume into a 2D image, in which rib centerlines are extracted from the 3D CT volume data. Based on the centerline result for each rib, long axes of the ellipse-shaped cross-section of the detected at various points along the rib centerline. As used herein, the term "up-vector" refers to the direction of the long axis of a substantially ellipse-shaped cross-section of a rib at a given point on the rib. The rib unfolding can be implemented by generating a 2D image using image data from the 3D CT volume along the direction defined by the up-vector for each point along each rib. Accordingly, how to determine the up-vector correctly at each point along a rib is of great importance to the final rib cage unfolding result. Considering the fact that the rib cage protects the lungs and abdominal organs, it may be reasonable to assume that the up-vectors of the ribs are tangential to an imaginary surface fitted through all of the ribs. Under this assumption the surface through all of the ribs can be approximated as a union of all spline curves interpolated by neighboring points on all ribs. This method for predicting the up-vectors works well on all ribs except the first pair of ribs (i.e., the ribs closest to the neck). Since the first pair of ribs is usually must shorter, narrower, and flatter that the other pairs of ribs, the surface fitting method does not work well for the first pair of ribs. Embodiments of the present invention provide methods of up-vector prediction/detection that improve the result of 3D to 2D rib unfolding for the first pair of ribs. It s to be understood that the methods described herein are not limited to the first pair of ribs, but can be applied to the other ribs as well.

Figure 1:
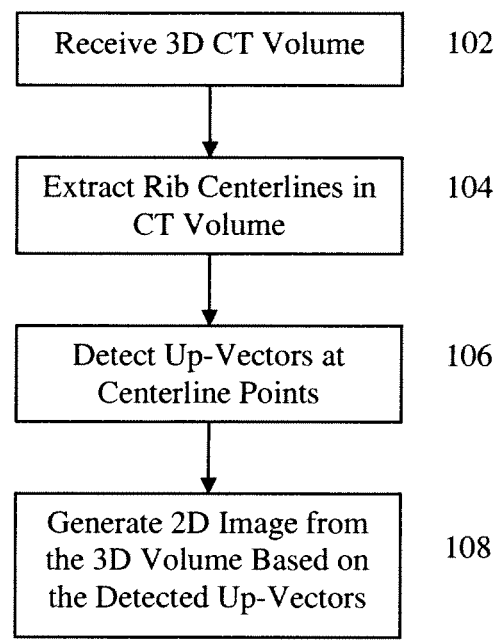
FIG. 1 illustrates a method of unfolding ribs in a 3D computed tomography (CT) volume into a 2D image.

FIG. 1 illustrates a method of unfolding ribs in a 3D CT volume into a 2D image. The method of FIG. 1 transforms CT volume data representing ribs to generate a 2D image of "unfolded" ribs in order to provide improved visualization of the patient's ribs. As illustrated in FIG. 1, at step 102, a CT volume is received. The CT volume includes a rib area of a patient. The CT volume can be received directly from a CT scanner or the CT volume can be received by loading a previously stored CT volume.

At step 104, rib centerlines are extracted in the CT volume. The rib centerlines may be extracted in the 3D CT volume using an automatic or semi-automatic rib centerline extraction method. In an advantageous embodiment of the present invention, the rib centerline for each rib may be automatically extracted in the 3D CT volume using a learning-based deformable template matching method. In the learning-based deformable template matching method for automatic rib centerline extraction, a probability response map can be obtained from the 3D CT volume using learning-based rib center point detection can be performed with a coarse-to-fine pyramid learning structure. The obtained probability response map is then used to extract the rib centerlines via matching of a whole rib cage template. Each rib centerline can then be refined individually using active contour model refinement. The learning-based deformable template matching method for automatic rib centerline extraction is described in greater detail in U.S. Provisional Application No. 61/539,561, filed Sep. 27, 2011, which is incorporated herein by reference.

At step 106, up-vectors are detected at centerline points of the rib centerlines. In one embodiments of the present invention, the up-vectors can be detected using machine-learning based prediction. In this case, annotated ground truth of the ellipse shape on cross-sections of the ribs can be used as training examples in offline training of a machine-learning detector, such as a regression function. The trained detector is then applied to predict the up-vector for a given centerline point. In an alternative embodiment, the up-vectors can be detected using non-machine-learning based detection. In this case, an ellipse is directly detected on a cross-section image at a given centerline point, and the long axis of the detected ellipse is determined to be the up-vector at that centerline point.

Figure 2:
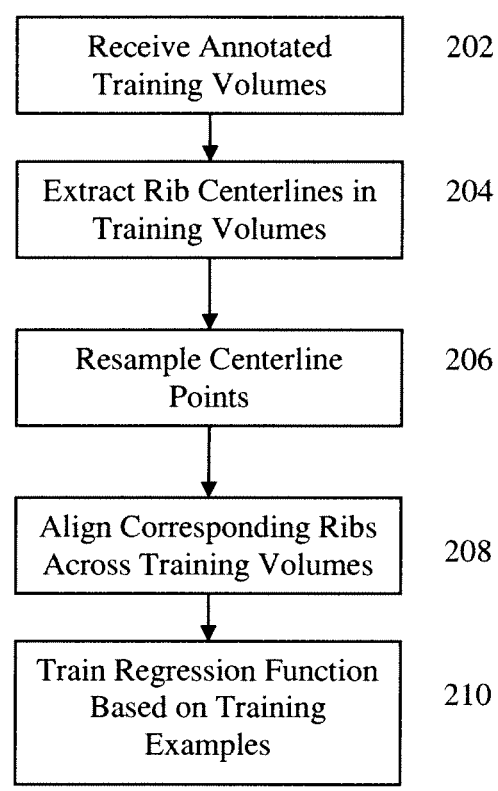
FIG. 2 illustrates a method for training a regression function for detecting up-vectors in a 3D CT volume, according to an embodiment of the present invention.

In the machine-learning-based up-vector detection, the problem of locating the long axis direction (up-vector) for a given rib centerline point can be abstracted into a regression problem. A regression function can be trained based on a set of training data having known inputs (rib centerline point locations) and outputs (up-vectors) to learn a relationship between the inputs and outputs of the training dataset. FIG. 2 illustrates a method for training a regression function for detecting up-vectors in a 3D CT volume, according to an embodiment of the present invention. The method of FIG. 2 can be performed offline prior to implementing the method of FIG. 1, and then the resulting trained regression function can be stored and used in the implementation of step 106 of FIG. 1.

Referring to FIG. 2, at step 202, a set of annotated training volumes are received. The training set includes volumes which have annotated ground truths of the ellipse-shaped cross-sections of the ribs, including rib centerline points, up-vectors, tangent vectors, and lung vectors. The tangent vector at a particular rib centerline point is a vector that is tangent to the rib centerline at the particular rib centerline point. The lung vector at a particular rib centerline point is a vector that points inward toward the lungs from the particular rib centerline point and is perpendicular to the tangent vector and up-vector at the particular rib centerline point. The training set may include only training examples from a particular set of ribs, such as only training examples from the first ribs, in order to specifically train regression function to be used for up-vector detection in the particular set of ribs. In this case, separate regression functions can be trained for different sets of ribs.

At step 204, the rib centerlines are extracted for the ribs in the training volumes. The rib centerlines can manually annotated or automatically selected, for example, using the methods described above in connection with step 104 of FIG. 1.

At step 206, the rib centerline points for corresponding ribs in different training volumes are resampled so that the number of samples (centerline points) for corresponding ribs in each volume is the same. In order to resample rib centerline points for corresponding ribs (e.g., first ribs) in the training volumes, a smallest number of centerline points (for the corresponding ribs) in all of the training volumes is determined. The goal is then to reduce the number of centerline points in all of the training volumes to this minimum number of points. In order to reduce the number of rib centerline points in a training volume, rib centerline points are iteratively removed until the number of rib centerline points in the training volume is equal to the minimum number of points. In each iteration, a distance is calculated from each rib centerline point to a nearest neighboring point is each direction along the rib centerline, and a point closest to its remaining nearest neighbors (i.e., lowest total distance from the point to its nearest neighbor in each direction) is removed. In this way, no interpolation is required and all points are still exactly a subset of the ground truth, which preserves the original information. This method for resampling the rib centerline points also roughly ensures an equal distance between the final set of rib centerline points for a given training volume.

At step 208, corresponding ribs are aligned across all of the training volumes. In order to align the corresponding ribs, a middle rib centerline point is determined for each rib being aligned. In particular, for each rib centerline point on the same rib, a first distance is calculated between the rib centerline point and a first end point on one end of the rib centerline (e.g., a left-most rib centerline point) and a second distance is calculated between the rib centerline point and a second end point on the other end of the rib centerline (e.g., a right-most rib centerline point). The rib centerline point that has the most similar values for the first and second distances is selected as the middle rib centerline point for that rib. The rib alignment is then perform based on a respective plane for each rib defined by the first end point, the middle rib centerline point, and the second end point for that rib. After extracting the planes for each of the ribs, each plane can be aligned to a coordinate system by placing the middle rib centerline point of the respective rib at the origin and rotating each plane to be aligned to the xy-plane of the coordinate system. Each plane is then rotated again so that the vector pointing from the first end point to the second end point is parallel to the x-axis of the coordinate system. This results in all planes being aligned on the xy-plane and the sides of the planes being parallel to each other. Next, it is checked if all of the ribs are on the same side of the coordinate system and if the curvature of all of the ribs is consistent. Ribs can then be flipped along the x- or y-axis if necessary. The same transformation applied to align each rib is also applied to the up-vectors associated with rib-centerline points of that rib.

At step 210, a regression function is trained based on the training examples. After the data is aligned, regression is applied to the training examples, resulting in a trained regression function. In an exemplary embodiment of the present invention, multivariate Partial Least Squares (PLS) regression is used to train the regression function. The general underlying model of multivariate (PLS) is as follows:

$$X=TP^T+E, Y=TQ^T+F,$$

where X (rib centerline points) is a matrix of n*m predictors, and Y (up-vectors) is a matrix of the same size responses. n is the number of training examples and m is the number of rib centerline points on each rib*3 (*3 is because the data is cascaded on the x, y, and z axes). T is an n*1 (1 is the number of latent factors to be determined) matrix of latent factors. P and Q are loading matrices. E and F are error terms. PLS regression assumes that both X and Y are generated by the same set of latent factors, and finds the latent factors iteratively by maximizing a covariance between them. PLS regression constructs estimates of the linear regression between X and Y as:

$$Y=X\tilde{B}+\tilde{B}_0.$$

The result of the PLS regression training gives the coefficients $\tilde{B}$ and $\tilde{B}_0$, thus resulting in a trained regression function that can be used to predict a set of outcomes Y (up-vectors) form a set of inputs X (rib centerline points).

In order to evaluate the trained regression function, leave-one-out cross-validation can be used, in which one of the training volumes is used for testing and the rest for training the regression coefficients. In this case, the trained regression function can be evaluated by calculating the mean of the cosine similarity between each estimated up vector and the respective ground truth up-vector in the testing volume. As a baseline comparison, the mean of the cosine similarity between the z vector ([0,0,1]) and the ground truth can also be determined.

The training method of FIG. 2 performs the regression "rib-wise", which preserves the whole rib structure. In an alternative embodiment, the regression can be performed "point-wise" instead. In this case, the resampling step (206) can be skipped and all ground truth points can be used. In the regression step (210), the data can be cascaded point-wise without differentiating different training volumes. Thus, in this embodiment, X (rib centerline points) is and n'*3 matrix of predictors, Y (up-vectors) is a matrix of the same size of responses, and n' is the number of rib centerline points in all training examples. An advantage of the point-wise regression is that much more training samples can be used to train the regression function. A disadvantage is that the trained regression function carries less of the global rib structure information.

As described above in the method of FIG. 2, rib centerline points are used as the input X for training the regression function. In an alternate embodiment, image intensity features can be used as inputs as well. In this case, both the rib centerline points and image features associated with each centerline point can be used as inputs X for training the regression function. At each rib centerline point, the direction of the rib can be calculated by taking the difference between two adjacent center points. A cutting plane which is orthogonal to this norm vector (representing the direction of the rib) can then be determined. The cutting plane is determined by locating two perpendicular vectors on the plane, v1 and v2. Vector v1 is determined by taking the outer product of the norm vector and the unit z vector ([0,0,1]) (in case that the norm vector is the z vector, the v1 and v2 are x and y vector respectively). Vector v2 is a vector that is perpendicular to v1 and the norm vector. Accordingly, vectors v1 and v2 define the cutting plane perpendicular to the norm vector. Samples of image intensity features are extracted on the orthogonal cutting plane. Starting from the rib centerline point and in the direction of v1 and every theta angle away from v1, a certain number of points are sampled along each direction (adjacent points are one pixel away). Trilinear interpolation is used to determine the pixel value at each sample point. These pixel values can be rearranged in a column vector to be used in the regression. Accordingly, in addition to each rib centerline point's position, a set of intensity features corresponding to each rib centerline point can be used as input in the learning process used to train the regression function.

Figure 3:
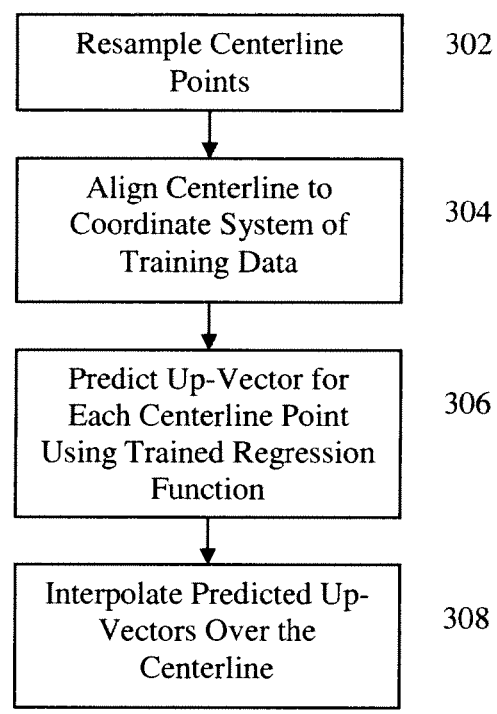
FIG. 3 illustrates a method of detecting up-vectors at a plurality of rib centerline points using a trained regression function according to an embodiment of the present invention.

FIG. 3 illustrates a method of detecting up-vectors at a plurality of rib centerline points using a trained regression function according to an embodiment of the present invention. The method of FIG. 3 can be used to implement step 106 of FIG. 1. As illustrated in FIG. 3, at step 302, the rib centerline points for each rib are resampled. In particular, the rib centerline points for a rib are resampled to reduce the number of rib centerline points to a predetermined number corresponding to a number of rib centerline points for that rib in a set of training volumes used to train the regression function. The number of rib centerline points for each rib can be reduced to the predetermined number using the resampling method described above in connection to step 206 of FIG. 2. In particular, rib centerline points of a rib are iteratively removed until the number of rib centerline points for that is equal to the predetermined number. In each iteration, a distance is calculated from each rib centerline point to a nearest neighboring rib centerline point in each direction along the rib centerline, and the rib centerline point closest to its remaining nearest neighbors (i.e., lowest total distance from the rib centerline point to its nearest neighbor in each direction) is removed.

It is to be understood that the method of FIG. 3 describes detection of up-vectors using the "rib-wise" regression function trained using the method of FIG. 2. In a case in which a "point-wise" regression function is trained based on all of the rib centerline points in the training volumes, step 302 can be omitted and up-vectors can be detected using the trained regression function for all rib centerline points of the received volume.

At step 304, the rib centerline (i.e., the rib centerline points) for each rib is aligned to the coordinate system of the training volumes. The rib centerline for each rib can aligned to the coordinate system of the training volumes as described above in connection with step 208 of FIG. 2. In particular, a middle rib centerline point of a set of rib centerline points for a rib is identified. For each rib centerline point, a first distance is calculated between the rib centerline point and a first end point of the set of rib centerline points (e.g., a left-most one of the rib centerline points) and a second distance is calculated between the rib centerline point and a second end point of set of the rib centerline points (e.g., a right-most one of the rib centerline points). The rib centerline point that has the most similar values for the first and second distances is selected as the middle rib centerline. A plane is defined by the first end point, the middle rib centerline point, and the second end point. The plane can be aligned to the coordinate system of the training volumes by placing the middle rib centerline point at the origin and rotating the plane to be aligned to the xy-plane of the coordinate system. The plane can then be rotated again so that the vector pointing from the first end point to the second end point is parallel to the x-axis of the coordinate system. Next, it can be determined if the rib centerline points are on the same side of the coordinate system as in the training volumes and if the curvature of the rib centerline is consistent with the curvature in the training volumes. The rib centerline points can then be flipped along the x- or y-axis if necessary based on this determination.

At step 306, the up-vector is detected for each rib centerline point using the trained regression function. In particular, a set of up-vectors Y can be determined from a corresponding to a set of input rib centerline points X using the trained regression function $Y=X\tilde{B}+\tilde{B}_0$, where the coefficients $\tilde{B}$ and $\tilde{B}_0$ are learned from the training data, as described above. It is to be understood that if the trained regression function is trained using images features in addition to the rib centerline point locations, the image features can be extracted, as described above, for each of the rib centerline points in the received volume and used along with the rib centerline points as inputs to the trained regression function to detect the up-vectors.

At step 308, the up-vectors detected for the rib centerline points of each rib are interpolated over remaining points along the rib centerline. Since, the number of centerline points for each rib may be reduced in the resampling step (302), an up-vector may not be detected by the trained regression function for each point along the rib centerline. Accordingly, interpolation can be used to determine an up-vector for each point along a rib centerline for which the up-vector was not detected by the trained regression function. For example, linear interpolation or any other interpolation technique can be used to interpolate the up-vectors over the remaining points of a rib centerline.

Figure 4:
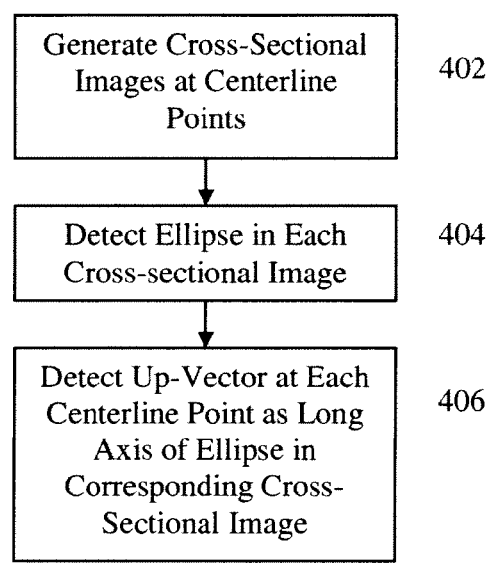
FIG. 4 illustrates a method of detecting up-vectors for a plurality of rib-centerline points according to another embodiment of the present invention.

FIG. 4 illustrates a method of detecting up-vectors for a plurality of rib-centerline points according to another embodiment of the present invention. The method of FIG. 4 can be used to implement step 106 of FIG. 1 without using machine-learning-based detection. As illustrated in FIG. 4, at step 402, a cross-sectional image is generated at each rib centerline point. The cross-sectional image at a rib centerline point can be generated as a 2D image on the orthogonal cutting plant the rib centerline point. A norm vector defining a rib direction can be calculated at a rib centerline point by taking the difference between the two adjacent rib centerline points. The cross-sectional image is generated on the cutting plane which is orthogonal to this norm vector. The orthogonal cutting plane is determined by locating two perpendicular vectors on the plane, v1 and v2. Vector v1 is determined by taking the outer product of the norm vector and the unit z (vector ([0,0,1]) (in case that the norm vector is the z vector, the v1 and v2 are x and y vector respectively). It is to be understood in 3D medical imaging, the unit z vector refers to a direction an "up-down" direction from a patient's feet to a patient's head, the x vector refers to a "left-right" direction, and the y vector refers to a "front-back" direction. Vector v2 is a vector that is perpendicular to v1 and the norm vector. Accordingly, vectors v1 and v2 define the cutting plane perpendicular to the norm vector. The cross-sectional image is generated by extracting an n×n sub-image in the orthogonal cutting plane from the 3D Ct volume. Trilinear interpolation is used to determine the pixel value at each point in the cross-sectional image from the voxel values in the 3D CT volume.

At step 404, an ellipse is detected in each cross-sectional image. A Hough transform can be applied to a cross-sectional image to detect an ellipse in the cross-sectional image. The Hough transform uses an input gradient information extracted from the cross-sectional image and detects an ellipse shape in the cross-sectional image based on the gradient information. In an advantageous embodiment gradient and intensity thresholding can be applied to the cross-sectional image prior to applying the Hough transform, such that only pixels having gradient values and intensity values larger than respective thresholds are processed by the Hough transform. The gradient thresholding ensures that only strong edges (i.e., pixels with high gradients) are input to the Hough transform, while the intensity thresholding attempts to confine the Hough transform processing to an area of the cross-sectional image that includes the rib cross-section.

Figure 5:
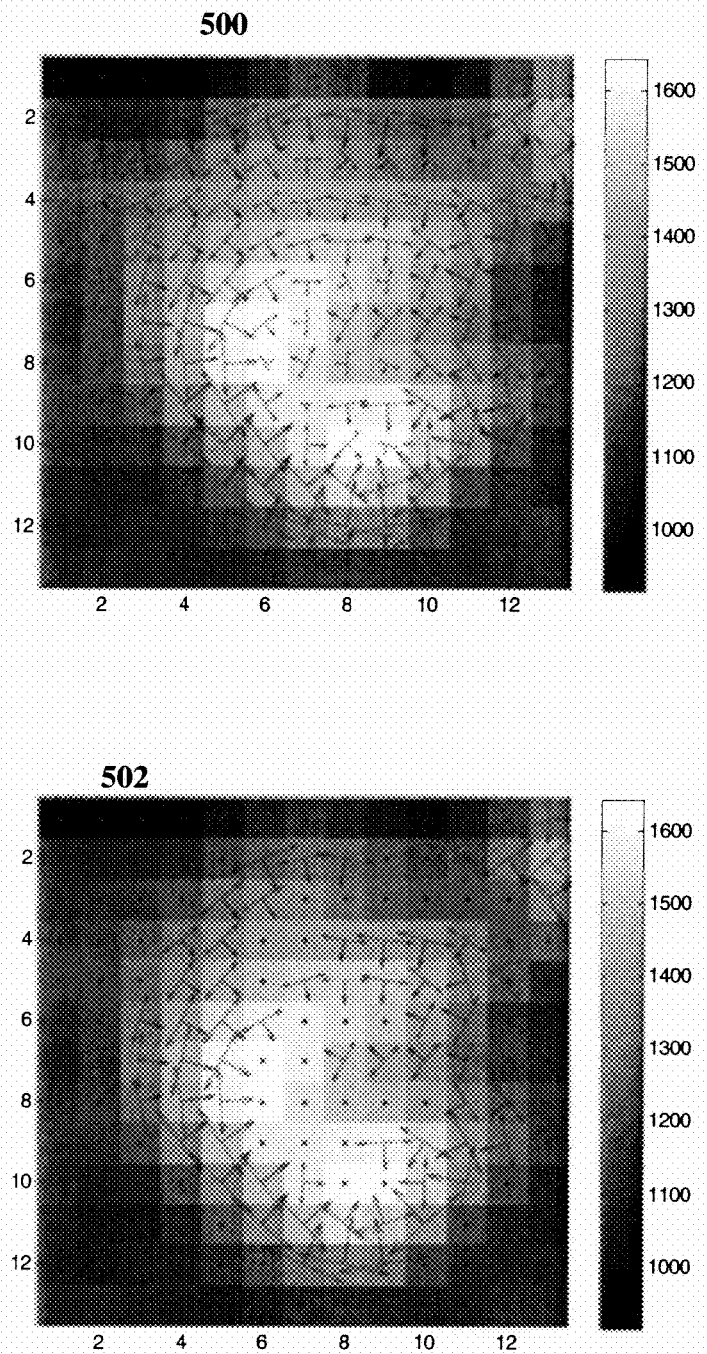
FIG. 5 illustrates an exemplary cross-sectional image before and after intensity and gradient thresholding.
Figure 6:
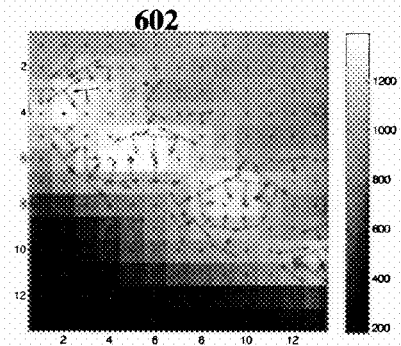
FIG. 6 illustrates additional exemplary cross-sectional images after intensity and gradient thresholding.
Figure 6:
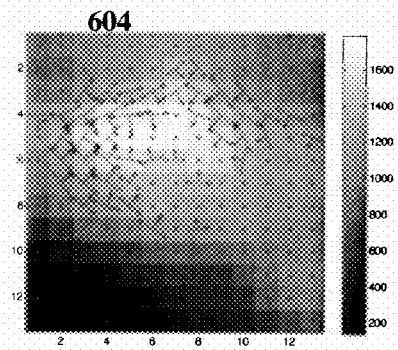
Figure 6:
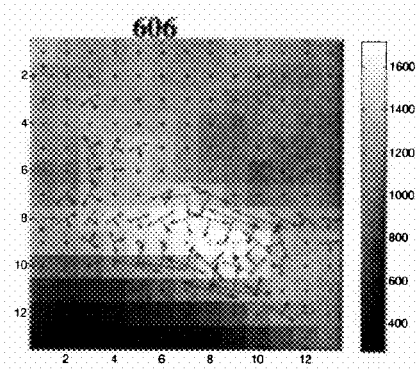
Figure 6:
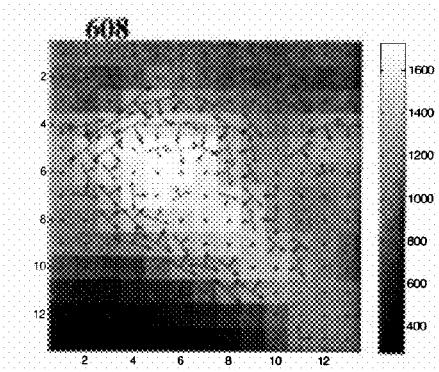
Figure 6:
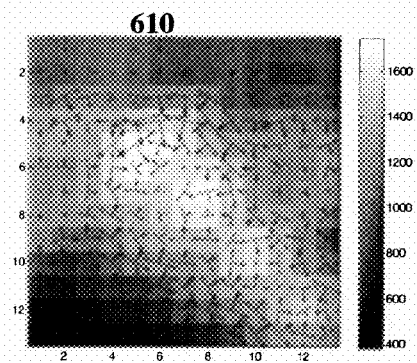
Figure 6:
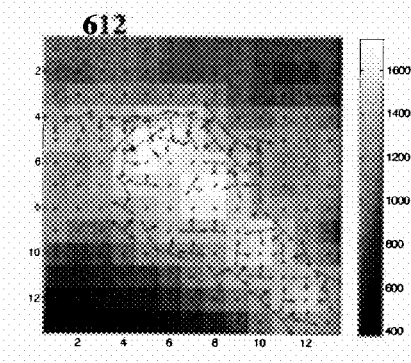

FIG. 5 illustrates an exemplary cross-sectional image before and after intensity and gradient thresholding. As shown in FIG. 5, image 500 shows the cross-sectional image before intensity and gradient thresholding and image 502 shows the cross-sectional image after intensity and gradient thresholding. The arrows represent gradient and norm vectors for each pixel. FIG. 6 illustrates additional exemplary cross-sectional images 602, 604, 606, 608, 610, and 612 after intensity and gradient thresholding.

Returning to FIG. 4, at step 406, the up-vector for each rib centerline point is detected as the long axis of the ellipse detected in cross-sectional image corresponding to the rib centerline point.

Returning to FIG. 1, at step 108, 2D image is generated from the 3D CT volume based on the detected up-vectors and the rib-centerlines. In particular, a 2D image visualizing the unfolded rib cage can be generated by first aligning the centerline of each rib to an x-axis of the 2D image. Then, for each point along a rib centerline, intensity values are extracted from the 3D volume for a number of pixels along the up-vector detected for the respective rib centerline point in both directions from the rib centerline point (i.e., a number of pixel in the up-vector direction and a number of pixels in a direction opposite to the up-vector), and the extracted intensity values are assigned to pixels above and below each rib centerline point in the y direction of the 2D image. That is, in the resulting 2D image each rib centerline is parallel to an x-axis of the image and at a given point along a particular rib centerline, the pixels in the y-direction surrounding the given point are extracted from the 3D volume along the up-vector corresponding to point on the rib centerline. In addition to or instead of to a single 2D image showing the whole unfolded ribcage, it is possible to generate a 2D image showing a particular rib or a particular set of ribs (e.g., the first ribs). The generated 2D image (or images) can be displayed, for example, of a display of computer system and stored in a memory or storage of a computer system.

Figure 7:
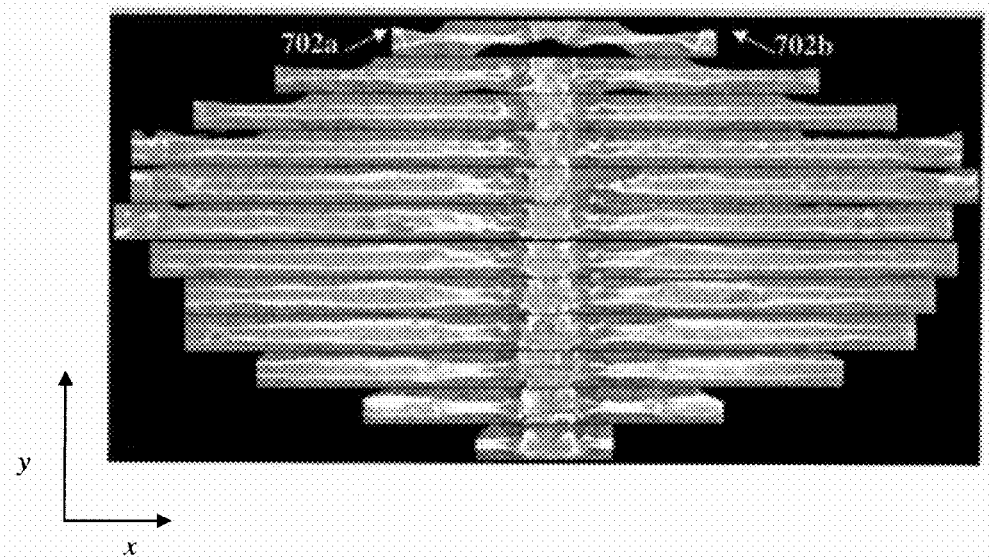
FIG. 7 illustrates an exemplary 2D unfolded ribcage image.

FIG. 7 illustrates an exemplary 2D unfolded ribcage image. As illustrated in FIG. 7, a centerline for reach rib, including the first ribs 702a and 702b is aligned with an x-direction of the image. At each point along the centerline of each rib, the up-vector for that point defines the y-axis at that point. That is the pixels above and below any particular rib centerline point in the y direction of FIG. 7 are extracted from an input 3D volume along the up-vector detected for the particular rib centerline point.

The above described methods are described using computed tomography (CT) as the imaging modality, but the present invention is not limited thereto. The above described methods may be similarly applied on other imaging modalities, such as magnetic resonance (MR), x-ray, ultrasound, etc.

Figure 8:
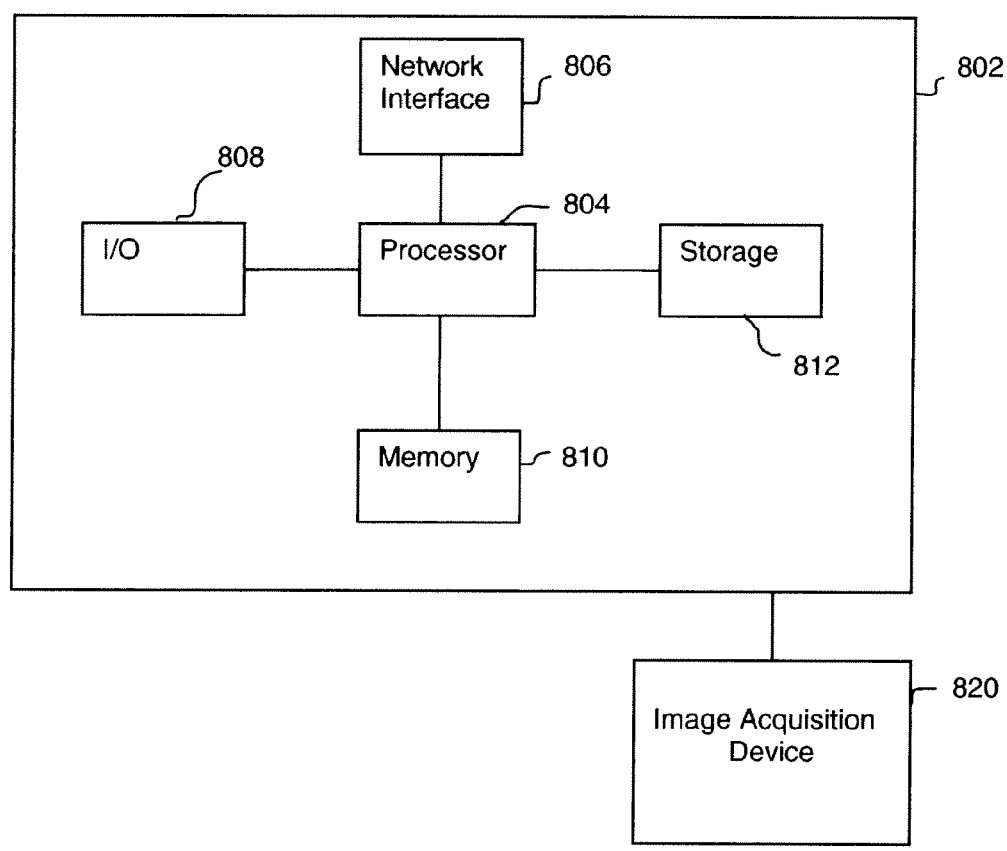
FIG. 8 is a high level block diagram of a computer capable of implementing the present invention.

The above-described methods for unfolding ribs from 3D volume to a 2D image, training a regression function, and detecting up-vectors for rib centerline points may be implemented on a computer using well-known computer processors, memory units, storage devices, computer software, and other components. A high level block diagram of such a computer is illustrated in FIG. 8. Computer 802 contains a processor 804 which controls the overall operation of the computer 802 by executing computer program instructions which define such operation. The computer program instructions may be stored in a storage device 812, or other computer readable medium (e.g., magnetic disk, CD ROM, etc.) and loaded into memory 810 when execution of the computer program instructions is desired. Thus, the steps of the methods of FIGS. 1, 2, 3, and 4 may be defined by the computer program instructions stored in the memory 810 and/or storage 812 and controlled by the processor 804 executing the computer program instructions. An image acquisition device 820, such as a CT scanner, can be connected to the computer 802 to input images to the computer 802. It is possible to implement the image acquisition device 820 and the computer 802 as one device. It is also possible that the image acquisition device 820 and the computer 802 communicate wirelessly through a network. The computer 802 also includes one or more network interfaces 806 for communicating with other devices via a network. The computer 802 also includes other input/output devices 808 that enable user interaction with the computer 802 (e.g., display, keyboard, mouse, speakers, buttons, etc.). One skilled in the art will recognize that an implementation of an actual computer could contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method, comprising:
    extracting a rib centerline of at least one rib in a 3D medical image volume; and
    automatically detecting an up-vector at each of a plurality of centerline points of the rib centerline of the at least one rib by detecting the up-vector at each of the plurality of centerline points using a trained regression function, wherein detecting the up-vector at each of the plurality of centerline points using a trained regression function comprises:
        resampling the plurality of centerline points to create a reduced set of centerline points;
        aligning the rib centerline with a coordinate system of training volumes used to train the regression function; and
        detecting the up-vector at each of the reduced set of centerline points using the trained regression function.

2. The method of claim 1, wherein the step of resampling the plurality of centerline points to create a reduced set of centerline points comprises:
    (a) calculating for each of the plurality of centerline points a combined distance from nearest neighboring centerline points on each side of that centerline point;
    (b) removing the centerline point from the one of the plurality of centerline points having lowest combine distance from the nearest neighboring centerline points on each side of that centerline point; and
    (c) repeating steps (a) and (b) until the number of the plurality of centerline points is reduced to a predetermined number.

3. The method of claim 1, wherein the step of detecting the up-vector at each of the plurality of centerline points using a trained regression function further comprises:
    detecting the up-vector at remaining ones of the plurality of centerline points not included in the reduced set of centerline points by interpolating the up-vectors detected at the reduced set of centerline points.

4. The method of claim 1, wherein detecting the up-vector at each of the reduced set of centerline points using the trained regression function comprises:
    extracting image features associated with each of the reduced set of centerline points; and
    detecting the up-vector at each of the reduced set of centerline points using the trained regression function based on the reduced set of centerline points and the image features associated with each of the reduced set of centerline points.

5. The method of claim 4, wherein the step of extracting image features associated with each of the reduced set of centerline points comprises, for each of the reduced set of centerline points:
    detecting a cutting plane orthogonal to a rib direction at the centerline point; and
    sampling pixel values in the cutting plane detected at the centerline point.

6. The method of claim 1, further comprising:
    generating a 2D image of the at least one rib from the 3D medical image volume based on the extracted rib centerline of the at least one rib and the detected up-vector for each of the plurality of centerline points.

7. The method of claim 6, wherein the rib centerline of the at least one rib is aligned with an x-axis in the 2D image, and at each respective one of the plurality of centerline points along the rib centerline, pixels values along a y-axis in the 2D image are extracted from the 3D medical image volume along the up-vector detected at the respective one of the plurality of centerline points.

8. The method of claim 1, wherein the 3D medical image volume comprises a 3D computed tomography (CT) volume.

9. A method, comprising:
    extracting a rib centerline of at least one rib in a 3D medical image volume; and
    automatically detecting an up-vector at each of a plurality of centerline points of the rib centerline of the at least one rib, wherein the step of automatically detecting an up-vector at each of a plurality of centerline points of the rib centerline of the at least one rib comprises:
    generating a cross-sectional image at each of the plurality of centerline points; and
    detecting an ellipse in each cross-sectional image, wherein a long axis of the ellipse detected in each cross-sectional image defines the up-vector at the respective one of plurality of centerline points.

10. The method of claim 9, wherein the step of generating a cross-sectional image at each of the plurality of centerline points comprises:
    detecting a cutting plane orthogonal to a rib direction at each of the plurality of centerline points; and
    generating the cross-sectional image in the cutting plane from the 3D medical image volume.

11. The method of claim 9, wherein the step of detecting an ellipse in each cross-sectional image comprises:
    detecting the ellipse in each cross-sectional image using a Hough transform.

12. The method of claim 9, wherein the step of detecting an ellipse in each cross-sectional image further comprises:
    applying intensity and gradient thresholding to each cross-sectional image prior to detecting the ellipse in each cross-sectional image using a Hough transform.

13. The method of claim 9, further comprising:
    generating a 2D image of the at least one rib from the 3D medical image volume based on the extracted rib centerline of the at least one rib and the detected up-vector for each of the plurality of centerline points.

14. The method of claim 13, wherein the rib centerline of the at least one rib is aligned with an x-axis in the 2D image, and at each respective one of the plurality of centerline points along the rib centerline, pixels values along a y-axis in the 2D image are extracted from the 3D medical image volume along the up-vector detected at the respective one of the plurality of centerline points.

15. An apparatus, comprising:
means for extracting a rib centerline of at least one rib in a 3D medical image volume; and
means for automatically detecting an up-vector at each of a plurality of centerline points of the rib centerline of the at least one rib using a trained regression function, wherein the means for automatically detecting an up-vector at each of a plurality of centerline points of the rib centerline of the at least one rib using a trained regression function comprises:
means for resampling the plurality of centerline points to create a reduced set of centerline points;
means for aligning the rib centerline with a coordinate system of training volumes used to train the regression function; and
means for detecting the up-vector at each of the reduced set of centerline points using the trained regression function.

16. The apparatus of claim 15, wherein the means for detecting the up-vector at each of the reduced set of centerline points using the trained regression function comprises:
means for extracting image features associated with each of the reduced set of centerline points; and
means for detecting the up-vector at each of the reduced set of centerline points using the trained regression function based on the reduced set of centerline points and the image features associated with each of the reduced set of centerline points.

17. The apparatus of claim 15, further comprising:
means for generating a 2D image of the at least one rib from the 3D medical image volume based on the extracted rib centerline of the at least one rib and the detected up-vector for each of the plurality of centerline points.

18. An apparatus, comprising:
means for extracting a rib centerline of at least one rib in a 3D medical image volume; and
means for automatically detecting an up-vector at each of a plurality of centerline points of the rib centerline of the at least one rib, wherein the means for automatically detecting an up-vector at each of a plurality of centerline points of the rib centerline of the at least one rib comprises:
means for generating a cross-sectional image at each of the plurality of centerline points; and
means for detecting an ellipse in each cross-sectional image, wherein a long axis of the ellipse detected in each cross-sectional image defines the up-vector at the respective one of plurality of centerline points.

19. The apparatus of claim 18, further comprising:
means for generating a 2D image of the at least one rib from the 3D medical image volume based on the extracted rib centerline of the at least one rib and the detected up-vector for each of the plurality of centerline points.

20. A non-transitory computer readable medium storing computer program instructions, which when executed on a processor cause the processor to perform a method comprising:
extracting a rib centerline of at least one rib in a 3D medical image volume; and
automatically detecting an up-vector at each of a plurality of centerline points of the rib centerline of the at least one rib by detecting the up-vector at each of the plurality of centerline points using a trained regression function, wherein detecting the up-vector at each of the plurality of centerline points using a trained regression function comprises:
resampling the plurality of centerline points to create a reduced set of centerline points;
aligning the rib centerline with a coordinate system of training volumes used to train the regression function; and
detecting the up-vector at each of the reduced set of centerline points using the trained regression function.

21. The non-transitory computer readable medium of claim 20, wherein the step of detecting the up-vector at each of the plurality of centerline points using a trained regression function further comprises:
detecting the up-vector at remaining ones of the plurality of centerline points not included in the reduced set of centerline points by interpolating the up-vectors detected at the reduced set of centerline points.

22. The non-transitory computer readable medium of claim 20, wherein detecting the up-vector at each of the reduced set of centerline points using the trained regression function comprises:
extracting image features associated with each of the reduced set of centerline points; and
detecting the up-vector at each of the reduced set of centerline points using the trained regression function based on the reduced set of centerline points and the image features associated with each of the reduced set of centerline points.

23. The non-transitory computer readable medium of claim 20, wherein the method further comprises:
generating a 2D image of the at least one rib from the 3D medical image volume based on the extracted rib centerline of the at least one rib and the detected up-vector for each of the plurality of centerline points.

24. The non-transitory computer readable medium of claim 23, wherein the rib centerline of the at least one rib is aligned with an x-axis in the 2D image, and at each respective one of the plurality of centerline points along the rib centerline, pixels values along a y-axis in the 2D image are extracted from the 3D medical image volume along the up-vector detected at the respective one of the plurality of centerline points.

25. A non-transitory computer readable medium storing computer program instructions, which when executed on a processor cause the processor to perform a method comprising:
extracting a rib centerline of at least one rib in a 3D medical image volume; and
automatically detecting an up-vector at each of a plurality of centerline points of the rib centerline of the at least one rib, wherein the step of automatically detecting an up-vector at each of a plurality of centerline points of the rib centerline of the at least one rib comprises:
generating a cross-sectional image at each of the plurality of centerline points; and
detecting an ellipse in each cross-sectional image, wherein a long axis of the ellipse detected in each cross-sectional image defines the up-vector at the respective one of plurality of centerline points.

26. The non-transitory computer readable medium of claim 25, wherein the step of detecting an ellipse in each cross-sectional image comprises:
   detecting the ellipse in each cross-sectional image using a Hough transform.

27. The non-transitory computer readable medium of claim 25, wherein the method further comprises:
   generating a 2D image of the at least one rib from the 3D medical image volume based on the extracted rib centerline of the at least one rib and the detected up-vector for each of the plurality of centerline points.

28. The non-transitory computer readable medium of claim 27, wherein the rib centerline of the at least one rib is aligned with an x-axis in the 2D image, and at each respective one of the plurality of centerline points along the rib centerline, pixels values along a y-axis in the 2D image are extracted from the 3D medical image volume along the up-vector detected at the respective one of the plurality of centerline points.

* * * * *